United States Patent [19]

Simoneau et al.

[11] 4,145,308

[45] Mar. 20, 1979

[54] ANTI-FOAM SILICONE EMULSION, AND PREPARATION AND USE THEREOF

[75] Inventors: E. Thomas Simoneau, Greenwich; John J. Sheridan, Jr., Mechanicville, both of N.Y.

[73] Assignee: General Electric Company, Waterford, N.Y.

[21] Appl. No.: 813,600

[22] Filed: Jul. 7, 1977

[51] Int. Cl.$^2$ .............................................. B01D 19/04
[52] U.S. Cl. .................................. 252/321; 252/314; 252/358
[58] Field of Search ................................ 252/321, 358

[56] References Cited

U.S. PATENT DOCUMENTS

| 3,746,653 | 7/1973 | Churchfield | 252/358 X |
| 4,005,044 | 1/1977 | Raleigh | 252/358 |

Primary Examiner—Richard D. Lovering
Attorney, Agent, or Firm—John L. Young; E. Philip Koltos; Philip L. Schlamp

[57] ABSTRACT

An anti-foam silicone composition comprising a diorganopolysiloxane polymer having a viscosity varying from 100 to 100,000 centipoise at 25° C. and from 1 to 15% by weight of the diorganopolysiloxane of a silicone resin composed of monofunctional units and tetrafunctional units.

20 Claims, No Drawings

ANTI-FOAM SILICONE EMULSION, AND PREPARATION AND USE THEREOF

BACKGROUND OF THE INVENTION

The present invention relates to anti-foam silicone compositions and more particularly the present invention relates to improved anti-foam silicone compositions having therein a silicone resin composed of monofunctional siloxy units and tetrafunctional siloxy units.

As is well known, there are a number of processes in various types of industries that result in a creation of a foam during the process. Sometimes such a foam is desirable, in other cases the foam is undesirable.

Accordingly, in industries such as for example the chemical industry, the food industry, the petroleum industry, the textile finishing industry and the pharmaceutical industry in many cases during the processing of material undesirable foam is formed in some parts of the process. A foam is formed when the rate of decay of foam is slower than the creation of new foam bubbles. Accordingly, when you have such a condition in a chemical or mechanical process there results the creation of an ever increasing foam, that is so stablized that it does not decay very rapidly. Accordingly, in such cases, it is desirable to utilize some means to remove the undesirable foam. It is desirable to remove or reduce the foaming in many processes, since the unwanted foam may create a hazard, such as fires hazard or as is well realized, the foam takes up a considerable amount of space thus requiring more space to carry out the process in. It may make the process itself difficult to operate efficiently. Accordingly, in such processes in which undesirable foam is formed, it is highly desirable to have some means of reducing or completely removing the foam. Although there are many ways of defoaming a process, the most desirable is the chemical means since this usually is the most efficient way to remove the foam. Thus, as is well known in industry by the addition of a small amount of an anti-foaming agent to a foamed composition, there results a rapid break-up of the foam.

Accordingly, as is well-known, one type of such anti-foaming agents that are widely used are silicone anti-foaming agents. Examples of silicone anti-foaming compositions are for instance to be found in U.S. Pat. Nos. 2,894,913; 3,423,340; 3,076,768 and 3,856,701 as well as in *Chemistry and Technology of Silicones* - Walter Noll - Academic Press, N.Y. (1968), Pages 626–627 and *Encyclopedia of Polymers, Science & Technology* - John Wiley & Sons, Inc. (1967), Volume II, Pages 164–170 and Volume 12, page 557. While most of the above art deals with some aspect of non-silicone and silicone anti-foam compositions, such art does not disclose improvements that can be made on the prior art silicone anti-foam compositions. Dimethylpolysiloxane polymers are widely known in the silicone industry. While such dimethylpolysiloxane polymers have very many well known uses, it is also well known they can be utilized as anti-foam agents. It has been found that the anti-foaming capabilities of such dimethylpolysiloxane polymers can be improved by incorporating into the composition a certain amount of a silica filler, such as fumed silica or precipitated silica. In addition, it has been found that the anti-foaming properties of dimethylsiloxanes could also be improved by preparing and using such dimethylpolysiloxanes without or with a silica filler in the form of an emulsion. Usually such emulsions comprise the dimethylpolysiloxane polymer, a silica filler, water and emulsifying agent wherein the ingredients are subjected to high shear agitation and colloidal mill shearing to produce a stable emulsion. The advantage of using such a mixture and specifically a silicone anti-foaming agent such as described above and specifically one in which the main ingredient is the dimethylpolysiloxane, is the dimethylpolysiloxanes are simple and efficient to produce in silicone industry and also at the same time are very effective as defoaming agents.

Accordingly, prior workers in the art have strived to improve the defoaming efficiency of dimethylpolysiloxanes utilized in anti-foam compositions. As it has been stated one successful attempt at this has been to incorporate a fumed or precipitated silica in with the dimethylpolysiloxane polymer to form the silicone anti-foam composition. As a further improvement, it has been found that when silazane treated precipitated silica is incorporated into a dimethylpoly-siloxane there results in an improved anti-foam composition. For instance note the disclosures of Raleigh U.S. Pat. Nos. 4,005,044 and 4,012,334 which are incorporated in the present case by reference. The above Raleigh and Raleigh, et al patents disclose not only that precipitated silica treated with a silazane can be incorporated in dimethylpolysiloxanes to result in an improved silicone anti-foaming composition but such disclosures also set forth that by use of precipitated silica treated with silazanes the silica filler can be more easily dispersed into the dimethylpolysiloxane to result in the improved compositions of the above patents. However, irrespective of the ease or difficulty of incorporating the fillers into the dimethylpolysiloxane, it is still desirable to improve the anti-foam efficiency of dimethylpolysiloxanes even further, so that less amounts of the silicone anti-foam composition can be utilized to destablize a particular foam. It should be noted the silicone resins are also well known. One preferred type of silicone resin for many applications is a silicone resin composed of monofunctional siloxy units and tetrafunctional siloxy units. Silicone resins are well-known additives so as to stabilize foams which are desirably produced and cured as such from well-known plastic systems. For instance, note that the disclosure in Simoneau, et al, U.S. Pat. No. 3,730,931 which discloses the utilization of silicone resins composed of monofunctional units and tetrafunctional siloxy units as the stablizing additive and surfactant in the formation of polyvinyl chloride cured foams. Accordingly, it was unexpected that the utilization of a silicone resin composed of monofunctional and tetrafunctional siloxy units in combination with a dimethylpolysiloxane would enhance the anti-foaming properties of such dimethylpolysiloxanes or diorganopolysiloxanes.

Accordingly, it is one object of the present invention to provide for an efficient silicone anti-foam composition.

It is an additional object of the present invention to provide for an efficient silicone anti-foam composition by means of incorporating into a diorganopolysiloxane polymer a silicone resin composed of monofunctional and tetrafunctional siloxy units so as to enhance the anti-foam properties of the diorganopolysiloxane polymer.

It is yet an additional object of the present invention to provide for a very efficient anti-foam silicone composition by incorporating in a diorganopolysiloxane polymer a silicone resin in combination with a silica filler.

It is still an additional object of the present invention to provide a process for forming an improved anti-foam silicone composition having as its basic ingredient a diorganopolysiloxane polymer.

It is yet a further object of the present invention to provide a process for efficiently defoaming a foam by adding to such foam a small quantity of a composition which is a mixture of a diorganopolysiloxane polymer, a silica filler and a silicone resin. These and other objects of the present invention are accomplished by means of the disclosure set forth herein below.

SUMMARY OF THE INVENTION

In accordance with the above objects of the present invention there is provided by the present invention a silicone anti-foam composition comprising a diorganopolysiloxane polymer having a viscosity varying from 100 to 100,000 centipoise at 25° C. with the organo groups being selected from the class consisting of monovalent hydrocarbon radicals and halogenated monovalent hydrocarbon radicals and from 1 to 15% by weight of said diorganopolysiloxane of a silicone resin composed of $R_3SiO_{0.5}$ units and $SiO_2$ units with the ratio of the monofunctional units to the tetrafunctional units varying from 0.25 to 0.75. Such a silicone resin can contain anywhere from 0.1 to 6% of hydroxyl group and preferably contains from 2 to 6% hydroxyl groups.

In the preferred embodiment of the present invention there is present in such anti-foam composition from 0.5 to 15% by weight of a filler selected from the class consisting of fumed silica and precipitated silica, which may be treated or untreated. Most preferably, the filler is precipitated silica which is desirably treated with cyclic polysiloxanes, low molecular weight linear polysiloxanes or more preferably treated with silazanes, such as hexamethyldisilazane. It has been found that such silicon anti-foam composition contains a diorganopolysiloxane polymer, a silicone resin composed of monofunctional and tetrafunctional siloxy units and a precipitated silica filler which is preferably treated with silazanes results in the most efficient anti-foam composition. In order to impart to such silicone anti-foam compositions, the improved dispersability in aqueous systems, it is desirable to form an emulsion from the above ingredients in water utilizing as emulsifying agents such well known emulsifying agents as sorbitan monostearate, polyoxyethylene sorbitan monostearate and/or polyoxyethylene stearate. The use of the silicone anti-foam composition in the form of a water emulsion results in the maximum efficiency in dispersing the silicone composition in foamed aqueous systems. Accordingly, the silicone anti-foam composition that is preferably produced and utilized in aqueous systems is in the form of an emulsion.

It should be noted that the composition is effective not only in defoaming aqueous systems, but it is also effective in defoaming some organic systems other than aromatic organic systems.

As it has been stated previously, although the silicone resin of the instant case may be utilized with a very low silanol content, it is preferred that the silanol content of the resin vary from 2 to 6%. It has been found that the higher the silanol content of the silicone resin composed of monofunctional and tetrafunctional siloxy units is, the better is its efficiency in defoaming a foamed system. In addition, it is desirable to utilize in a silicone anti-foam composition a silica filler having 1 to 15% by weight of hydroxyl groups, which is treated with a silazane. However, it should be noted that the instant anti-foam compositions are effective even with an untreated precipitated silica filler or even with a fumed silica filler at a concentration of 0.5 to 15% by weight of the diorganopolysiloxane. The preferred anti-foam compositions of the instant case can be prepared by simply mixing the diorganopolysiloxane polymer and the silicone resin with treated or untreated silica filler with high shear agitation or the mixing can be advantageously carried out at elevated temperatures as will be disclosed herein below.

DESCRIPTION OF THE PREFERRED EMBODIMENT

The diorganopolysiloxane polymer, which is the base anti-foam ingredient in the composition of the instant case can be any diorganopolysiloxane polymer having a viscosity varying from 100 to 100,000 centipoise at 25° and more preferably having a viscosity varying from 100 to 2,000 centipoise at 25° C. The organo groups can be any organo group commonly associated with such polymers and can generally be selected from alkyl radicals of 1 to 8 carbon atoms such as methyl, ethyl, propyl; cycloalkyl radicals such as cyclohexyl, cycloheptyl, cyclooctyl; mononuclear aryl radicals such as phenyl, methylphenyl, ethylphenyl and alkenyl radicals such as vinyl, allyl, etc. and also haloalkyl radicals such as 3,3,3 trifluoropropyl, etc. Most preferably the organo groups in such diorganopolysiloxane polymers are selected from lower alkyl radicals of 1 to 8 carbon atoms and are most preferably methyl. Such polymers have preferably up to 0.1% by weight of hydroxyl groups in them. It is preferred the diorganopolysiloxane polymer have some hydroxyl groups in the polymer since it has been found that this amount of silanol enhances the anti-foam ability of the diorganopolysiloxane polymer. In addition, the diorganopolysiloxane polymer may have up to 10% by weight of trifunctional siloxy units. As a more specific embodiment, the diorganopolysiloxane polymer may be selected from polymers having the formula $R'SiO_{4-a/2}$ where $R'$ is selected from monovalent hydrocarbon radicals and halogenated monovalent hydrocarbon radicals as explained previously and where a varies from 1.9 to 2.1. Such polymers are very well known in the silicone art and can be produced by various well known methods. One such method is to hydrolyze diorganodichlorosilanes in water and purify the hydrolyzate product by preferentially distilling out cyclic polysiloxanes to leave behind the low molecular weight diorganopolysiloxane polymer that is formed. Such a procedure is utilized to produce diorganopolysiloxane polymers in the viscosity range of 100 to 500 centipoise at 25° C. For the higher molecular weight polymers a different procedure is utilized. In such a procedure tetraorganocyclipolysiloxanes are taken and equilibrated at elevated temperatures, that is temperatures above 100° C. in the presence of acidic catalysts such as toluene sulfonic acid with the proper amount of chain stoppers. Such chain stoppers are most commonly hexamethyldisiloxane, octamethyltrisiloxane, etc. The amount of chain stoppers in the reaction mixture will determine the final viscosity and molecular weight of the polymer that is formed by such equilibration procedure. Such a procedure is commonly utilized to produce diorganopolysiloxane polymers and more preferably dimethylpolysiloxane polymers of a viscosity of anywhere from 500 to 100,000 centipoise at 25° C. After the equilibration reaction has been completed, the acid catalyst is neutralized with a mill base and the unreacted cyclics are stripped off.

In the present anti-foam silicone composition of the instant case, there is preferably present a silicone resin at a concentration of generally anywhere from 1 to 15% by weight of the diorganopolysiloxane polymer and more preferably at a concentration varying anywhere from 5 to 12% by weight of said diorganopolysiloxane polymer. Such a silicone resin, as stated previously, is composed of $R_3SiO_{0.5}$ units and $SiO_2$ units where the ratio of the monofunctional units and tetrafunctional units varies from 0.25 to 0.75. Such a resin may be a condensed resin in which most of the silanol groups are condensed out or it can be an uncondensed silicone resin where most or all of the silanol groups in the silicone resin are uncondensed. Generally, the silicone resin in the anti-foam silicone compositions of the instant case, contains anywhere from 0.1 to 6% by weight of hydroxyl groups and preferably contains from 2 to 6% by weight of hydroxyl groups for maximum anti-foam properties. The procedure for making such a silicone resin, is also well known as disclosed in the foregoing Simoneau, et al U.S. Pat. No. 3,730,931, which is incorporated by reference. Accordingly, such a silicone resin may be produced by hydrolyzing in water a diorganodichlorosilane and a tetrachlorosilane in the appropriate amounts to obtain the desired ratio of monofunctional units to tetrafunctional units in the silicone resin product. The silicone resin hydrolyzate that is formed is then separated from the excess water and acid and purified by well known techniques, such as for instance, by the addition of water and washing the silicone resin hydrolyzate to remove excess acid until the acid content is below 10 parts per million. In a similar procedure, such a resin can be formed by for instance hydrolyzing a triorganochlorosilane and ethylorthosilicate in ether. In addition, the hydrolysis can be carried out in hydrolysis medium composed of water and a water-immiscible organic solvent where the silicone resin hydrolyzate is soluble in the water-immiscible organic solvent and thus can be extracted from the water and thus purified by well known refluxing procedures. Such solvents are for instance xylene, toluene, benzene, etc. If it is desired to concentrate the silanol groups in such a silicone resin hydrolyzate that is formed then there may be simply added to a solution of the silicone resin in water-immiscible solvent anywhere from 10 parts to 500 parts per million of KOH and the mixture can be heated at elevated temperatures of above 100° C. for a period of time varying from 1 to 8 hours so as to reduce the silanol content to below 0.5% by weight. However, as mentioned previously, it is not desirable that the silicone resin that is utilized in the compositions of the instant case to have a low silanol content. For maximum anti-foaming imparting properties, it is desired that the silicone resin have a silanol content of anywhere from 2 to 6% by weight. In such anti-foam composition, the third necessary ingredient is a filler. Generally, there may be present anywhere from 0.5 to 15% by weight of a silica filler by weight of the diorganopolysiloxane polymer. More preferably, the filler is utilized at a concentration of anywhere from 5 to 15% by weight, based on the weight of the diorganopolysiloxane polymer in the compositions of the instant case. Such a filler can be any precipitated or fumed silica filler and desirably has a hydroxyl content of anywhere from 1 to 15% by weight. Preferred precipitated silica fillers that may be utilized that are commercially available for example from the Philadelphia Quartz Company sold under the name of QUSO-F22, S.C.M. Glidden Durkee Company sold as Silcron G-100, J. M. Huber Corporation sold as Zeothex 95 and W.R. Grace Company sold as Syloid-266. All these precipitated silica fillers are generally identified as hydrated silicon dioxide having a surface area from about 300 to 400 meters per gram and preferably having a moisture content generally in the area of 1 to 15% by weight and more preferably having a moisture content of about 7 to 15% by weight. Although it is desirable to utilize the precipitated fillers of the high hydroxyl content, fumed silica in the above concentration may be utilized in the instant invention. If fumed silica is utilized it is preferred that it have a hydroxyl content in the above ranges. However, fumed silica with a hydroxyl content, that is lower than desired will still act as an anti-foam additive in the composition although not as effective as precipitated silica. The silica filler functions in the anti-foam silicone composition to first impart some anti-foaming properties to the composition; second to enhance the dispersability of the silicone anti-foam composition in the foamed system; and thirdly, to enhance the stability of any emulsion that might be formed from the silicone anti-foam composition of the instant case as will be explained below.

Accordingly, for maximum effectiveness precipitated or fumed silica having a silanol content in the area of 7 to 10% or higher is preferred in the instant invention. However, fillers below this level will also function effectively although to a lesser extent. The filler may be treated with filler treating compound since this results in the filler enhancing the dispersability properties of the silicone anti-foam composition and in a more stable emulsion when the silicone anti-foam composition is emulsified. Examples of suitable treating agents for the fillers utilized in the anti-foam silicone compositions of the instant case are for instance silazanes, low molecular weight linear polysiloxanes and cyclic polysiloxanes, such as octamethylcyclotetrasiloxane. An example of a suitable silazane is hexamethyldisilazane.

The silicone anti-foam composition of the instant case can simply be formed from the diorganopolysiloxane polymer within the above description containing therein the desired amount of the silicone resin composed of monofunctional and tetrafunctional siloxy units. There should be noted in this respect that there is another type of resin similar, to the above that may be utilized in the practice of the instant case. Such a silicone resin may be composed of monofunctional siloxy units, difunctional siloxy units and tetrafunctional siloxy units.

Accordingly, such a silicone resin may be composed of $R''_3SiO_{0.5}$ monofunctional units $SiO_2$ tetrafunctional units and $R''_2SiO$ difunctional units with the ratio of monofunctional units to tetrafunctional units, to difunctional units being from 0.25–0.75 to 1 to 0.05–0.1 with the foregoing 0.1 to 6% by weight of silanol groups. Such a silicone resin is formed much in the same way as a silicone resin composed of only monofunctional siloxy units and tetrafunctional siloxy units. Both R' and R'' in the foregoing resins can be selected from any of the monovalent hydrocarbon radicals and halogenated monovalent hydrocarbon radicals identified above and recited for the organo groups of the diorganopolysiloxane polymer. Most preferably, R' and R'' are selected from alkyl radicals of 1 to 8 carbon atoms vinyl and phenyl radicals. Most preferably, R' and R'' are selected from methyl and vinyl. Such a silicone resin as stated previously, can be produced by the same method as was utilized to produce the silicone resin composed of monofunctional and tetrafunctional siloxy units except there is utilized as an additional reactant a difunctional organo silane, as for instance diorganodichlorosilane where the organo groups are as identified above for R''. More information as to the preparation of such resins can be found in the foregoing Simoneau et al. U.S. Pat. No. 3,730,931 which is incorporated in the present case by reference.

As stated previously, the instant anti-foam composition can specifically consist of only the diorganopolysiloxane polymer most commonly a dimethylpolysiloxane in combination with the silicone resin composed of monofunctional and tetrafunctional siloxy units. In a simple procedure such a mixture is prepared by simply dissolving the silicone resin in a solvent and adding the solution to the diorganopolysiloxane polymer and then with constant agitation, then the mixture is heated to remove all the solvent from the composition. As constituted, such a composition can be utilized as an antifoam silicone composition with improved results to defoam foamed systems.

In addition, the anti-foam composition in the instant case can also include the silica filler as explained above. Accordingly, such anti-foam composition would comprise the diorganopolysiloxane polymer, the silicone resin composed of monofunctional and tetrafunctional siloxy units and a silica filler. The procedure for preparing such a composition comprises mixing the diorganopolysiloxane polymer and the filler and from 1 to 2% by weight of the diorganopolysiloxane polymer of oleic acid. The oleic acid is simply used in this procedure to help wet out the silica filler and prevent it from clumping up while it is dispersed in the diorganopolysiloxane polymer which has also incorporated the silicone resin in it. Thus, after the mixture of the silicone resin and the diorganopolysiloxane polymer is formed there is simply added to such a mixture the amount of the desired silica filler with the desired silanol content and the 1 to 2% of oleic acid to facilitate the dispersion of the filler. This is carried out with high shear agitation. It is preferably desired at that point after some agitation under high shear to raise the temperature of the mixtures to 100°–200° C. for 1–3 hours so as to vent off volatiles, and to facilitate the dispersion of the filler in the silicone fluid. The resulting mixture may be passed through a homogenizer to reduce the particle size of the silica filler dispersed in the silicone fluid and aid in the dispersion of the filler in the fluid. The agitation is then continued for another 1–9 hours at a temperature above 150° C. and in the range of 100°–200° C. Accordingly, after such mixing of the filler into the silicone fluid with high shear agitation for a period of time varying anywhere from 2 to 6 hours at elevated temperatures of 100°–200° C. and more preferably at 150°–200° C. the mixture is cooled to room temperature under agitation and can be utilized as such as a silicone anti-foam composition, in accordance with the disclosure of the instant case. Various techniques may be utilized to aid the dispersion of the filler in the silicone compositions so as to form a stable dispersion of the filler in the silicone fluid.

It is also possible to utilize a more sophisticated form of the silicone anti-foam composition of the instant case by preparing it in the form of an emulsion and specifically an oil in water emulsion. The desirability of this is that with the use of such emulsions, and anti-foam silicone compositions of the instant case is easily dispersed in aqueous foam systems and accordingly, is more efficient and more effective in smaller quantities in defoaming the aqueous foam system and at a faster rate than is the case when such emulsions are not utilized.

As emulsifying agents, there can be utilized any emulsifying agents which are acceptable in the foamed system to which the anti-foam silicone composition will be added to. As emulsifying agents are compounds selected from conventional emulsifiers for example such as polyoxyethylene sorbitan monostearate (Tween 60) sorbitan monostearate (SPAN 60), polyoxyethylene stearate (Myrj 52S), and mixtures thereof. For most food contact application, it is preferred to utilize as emulsifying agents a mixture of sorbitan monostearate (Span 60), polyoxyethylene stearate (Myrj 52S), commercially available from the Atlas Chemical Company. Of course, as is well known, other traditional or desired ingredients may be added to emulsify anti-foam compositions of the instant case. For instance sorbic acid can be added at a concentration of anywhere from 0.01 to 0.1% by weight of the composition as a bactericide. In forming such an emulsion, and as disclosed in the Raleigh U.S. Pat. No. 4,005,044 preferably the emulsifying agent is dissolved in water, the diorganopolysiloxane with the silicone resin is dispersed in the emulsifying agents water solution; then a silazane treated silica filler is mixed into the dispersion and the resulting composition is milled. Although such a procedure is preferred since it speeds the dispersion of the filler to quickly form a stable emulsion, the present invention is not limited solely to such a mixing procedure. The method of Raleigh U.S. Pat. No. 4,005,044 is simply indicated above as the preferred method of producing the emulsion. Other procedures of forming the emulsion of the instant invention utilizing the anti-foam ingredients of the instant case, can be utilized to prepare the emulsion compound. One general method for producing the emulsion compound of the instant case and which is disclosed as exemplary in the Examples below consists of adding emulsifying agents such as sorbitan monostearate and oxyethylene stearate to water and heating the resulting mixture to temperatures at 60°–100° C. under high shear agitation. To this mixture there may be added the desired amount of the anti-foam composition consisting of the anti-foam compound which was described and was prepared as was discussed previously, that is the incorporation of the silica filler with high shear agitation into the fluid composed of the silicone resin and the diorganopolysiloxane polymer.

Accordingly, after the anti-foam compound has been added at a temperature between 60° and 100° C. mixing is continued for a period of time of anywhere from 1 to 5 hours until the mixture is uniform. Then additional water may be added to dilute the emulsion to the desired degree while still heating at a temperature of 60°–100° C. while at the same time maintaining the high shear agitation. The composition may then be cooled somewhat so that it can be handled on a colloidal mill and processed in the colloidal mill for a period of time of anywhere from 1 to 4 hours until the emulsion is uniform. The mixture that results is then a stable emulsion and may be utilized as an anti-foam composition with good dispersability. This procedure which was utilized in the Examples is given as exemplary only. It should be noted that irrespective of which procedure is utilized the procedure should be adopted to fit the particular needs of the specific application. Any method for mixing the ingredients can be utilized which produces a sufficiently stable emulsion in a short period of time.

It should be noted in this respect and with the respect to the emulsion compound that is formed that if the emulsion is too stable, then there will be difficulty in utilizing it since it will tend not to disperse efficiently as an anti-foam in the foamed system to which it is applied. If the emulsion is too unstable, on the other hand then the emulsion has a short shelf stability. It is preferred that the emulsions prepared in accordance with the instant case have a shelf stability of 6 months to a year. The Examples below are given for the purpose of illustrating the invention of the instant case. They are not being given for any purpose of setting limitations on the instant invention. All parts are by weight. In the compositions and compounds that were tested in the Examples, three test procedures were utilized to evaluate the compound. Thus, the compounds were evaluated for their viscosity after the particular composition was formed, then in the case of emulsions the sedimentation volume was determined. This procedure involves taking 40 cc's of the emulsion and spinning it at 3000 rpm's in a centrifuge with a six inch arm for 30 minutes then checking the re-distribution of the emulsion to note how much oil has separated out at the top of the sample and how much sediment has been formed at the bottom of the sample in cc's. This test is simply for testing the stability of the emulsion that has been formed. The most important test that has been run in the examples was the test to determine the defoaming effectiveness of the emulsion that was formed. Such a test, which procedure will be recited below has been developed by the Silicone Products Department of the General Electric Company for testing its anti-foam compounds. This procedure which was utilized to obtain the anti-foam value of the compounds and fluids recited in the examples below in milligrams of anti-foam additive per milliliter of a soap solution is as follows: (0.05% solution of sodium lauryl sulfate).

PROCEDURE

The equipment utilized was a two beater kitchen mixer; a 1500 milliliter beaker; a 4 dram vial with dropper; an analytical balance, a 50 milliliter burette graduated to a 0.1 milliliter; and 0.5% solution of sodium lauryl sulfate. The time and sequence for the successive additions of reagent to a sample which are described in the procedure are to be duplicated as closely as possible. The elapsed time between the successive additions of sodium lauryl sulfate solution is to be no greater than 30 seconds. In the procedure there is used in sequence toluene, acetone and distilled water to rinse the beaker and beaters between tests. A test temperature of 25° C. is preferred. Whatever temperature is utilized in the test should be recorded.

The procedure comprises:

1. to a 1500 milliliter beaker which has been arranged for mixing with the mixed, there is added 200 milliliters of distilled water. The mixer which is equipped with two beaters only is utilized at its maximum speed.

2. Add at a maximum rate of the 0.5% by weight of the sodium lauryl sulfate solution until the foam height just covers the beaters.

3. Immediately add enough sample to collapse the foam, usually one to two drops would suffice during preconditioning.

4. After the foam level has subsided again, add at a maximum rate of 0.5% by weight of sodium lauryl sulfate as described in Step 2.

5. Again there is added sufficient anti-foam compound to break the foam.

6. After the foam level has subsided, shut the mixer off. The time interval between the following two steps should be no longer than 10 minutes.

7. Weigh the bottle containing approximately 10 grams of sample and a medicine dropper graduated to ± 0.001 grams. Record the weight as W1.

8. Turn the mixer to maximum speed, record the volume of sodium lauryl sulfate reagent in the burette. Repeat Step 2 (each time noting the volume of reagent used) and Step 3 until 5 successive additions of reagent and sample have been made.

9. Weigh the weighing bottle with sample and dropper. Record the weight as W2.

10. Total the volume of each of the 5 additions of sodium lauryl sulfate added in Step 8. Record the volume as $V_t$. Divide by 5 to obtain the average volume $V_a$. Divide the average by 4. Add and subtract this result to $V_a$ to give the range $V_t$-$V_u$. Compare each of the 5 individual volumes to this range. They must fall within the range or else the test is to be repeated.

11. Calculate the ratio $R^3$ of the total weight in milligrams sample used to total volume in milliliters of sodium lauryl sulfate used; Calculating $R^3$ in accordance with the formula, the formula being R is = $(W_1-W_2)/V_t$.

12. Finally convert milligrams of sample versus milliliter of sodium lauryl sulfate solution to milligrams of silicone per milliliter of sodium lauryl sulfate solution so as to arrive at the anti-foam value of the sample utilizing the appropriate conversion factors, which anti-foam values are set forth in the Examples below. Utilizing this procedure there is determined how many milligrams of the silicone composition is needed to defoam the particular foaming agent. Sodium lauryl sulfate reagent is an excellent foaming agent.

Accordingly, using this procedure for determining the anti-foam value of the silicone compound or emulsion, as well as the test for determining the stability of the emulsion, the following examples were carried out:
- All of the parts in the examples are by weight.

EXAMPLE I

The following compounds and fluids were prepared for testing as will be explained below.

Compound A — comprising a 100 centipoise at 25° C. of a dimethylpolysiloxane polymer.

Compound B — comprising a 350 centipoise at 25° C. of a dimethylpolysiloxane polymer.

Compound C — comprising dimethylpolysiloxane polymer having a viscosity of 1000 centipoise at 25° C.

Compound D — comprising 95% by weight of a dimethylpolysiloxane of a viscosity of 350 centipoise at 25° C. plus 5% by weight of a silicone resin composed of trimethyl siloxy units and $SiO_2$ units with a ratio of the monofunctional to tetrafunctional units is 0.65–0.70 and with the hydroxyl content is 0.28%.

Compound E — comprising 95% by weight of a dimethylpolysiloxane polymer having a viscosity of 350 centipoise at 25° C. plus 5% by weight of a silicone resin composed of trimethyl siloxy monofunctional units and $SiO_2$ tetrafunctional siloxy units with a ratio of the monofunctional to the tetrafunctional siloxy units is 0.65–0.70 and which has a silanol content of 2% by weight.

Compound F — comprising 90% by weight of a dimethylpolysiloxane polymer of a viscosity of 350 centipoise at 25° C. plus 10% by weight composed of a condensed silicone resin having trimethyl siloxy monofunctional units and $SiO_2$ tetrafunctional units with the ratio of the monofunctional to tetrafunctional units is 0.65–0.70 and where the silanol content is 0.28%.

Compound G — comprising 90% by weight of a dimethylpolysiloxane polymer of a viscosity of 350 centipoise at 25° C. plus 10% of a silicone resin composed of trimethyl siloxy monofunctional units and $SiO_2$ tetrafunctional siloxy units with the ratio of the monofunctional to tetrafunctional siloxy units is 0.65–0.70 and where the silanol content of the resin is 2% by weight.

Compound H — comprising 90% by weight of a dimethylpolysiloxane of a viscosity of 1000 centipoise at 25° C. plus 10% by weight of a silicone resin composed of trimethylsiloxy monofunctional units and $SiO_2$ tetrafunctional siloxy units with the ratio of the monofunctional siloxy units to the tetrafunctional siloxy units is 0.65–0.70 and its resin has a silanol content of 2% by weight.

Compound I — comprising 90% by weight of a dimethylpolysiloxane polymer of 100 centipoise viscosity at 25° C. plus 10% by weight of a silicone resin composed of trimethyl siloxy monofunctional units and $SiO_2$ tetrafunctional siloxy units with a ratio of the monofunctional siloxy units to the tetrafunctional siloxy units is 0.65–0.70 and the resin has a silanol content of 2% by weight.

Compound J — comprising 90% by weight of a dimethylpolysiloxane polymer of 350 centipoise viscosity at 25° C. plus 10% by weight of a silicone resin composed of a trimethyl siloxy monofunctional units and $SiO_2$ tetrafunctional siloxy units with a ratio of the monofunctional siloxy units to the tetrafunctional units is 0.65–0.70. The resin has a silanol content of 2% by weight.

Compound K — comprising 90% by weight of a dimethylpolysiloxane polymer of 100 centipoise viscosity at 25° C. plus 10% by weight of a silicone resin composed of trimethyl siloxy monofunctional units and $SiO_2$ tetrafunctional siloxy units with a ratio of the monofunctional siloxy units to the tetrafunctional siloxy units is 0.65–0.70 and the resin has a silanol content of 2% by weight.

As will be explained below that in all the above compounds which were prepared by the procedure set forth hereinbelow, that in such compounds prior to the mixing and during the mixing that such compounds were prepared from a solution of the silicone resin in xylene or toluene in which the dissolved resin was present and that the foregoing weight percents of the silicone resin given above for Compounds A thru K were in terms of silicone resin solids.

EXAMPLE II

The above compounds wherein there is present a silicone resin in the compound were prepared as follows:

Into a three-necked flask equipped with a stirrer, thermometer, heating mantel, take-off head and condensor there was incorporated 1890 parts of the dimethylpolysiloxane oil and 353 parts of the solution of the silicone resin which was normally present in a 50% solid solution in the solvent. The resulting ingredients were mixed at room temperature. The xylene or toluene solvent that was present to dissolve the silicone resin prior to mixture was then stripped off by vacuum and nitrogen sparge after removing the stirrer. The temperature was raised to 130° C. to assure complete removal of the solvent. The material was then allowed to cool and used as is. It can be appreciated the quantities of ingredients would vary in accordance with the concentration of the silicone resin and dimethylpolysiloxane as set forth above for Compounds A thru K. In the case where a filler was incorporated into the compound, the procedure for incorporating the filler was as follows:

To a metal beaker there was added 1387.5 parts (92.4% by weight) or 1348 parts (89.9% by weight) of the fluid which may comprise as one having a silicone resin in it or a fluid having no silicone resin in it and to such a fluid there was added 112.5 parts (7.5% by weight) or 150 parts (10% by weight) of a filler and 2 grams of oleic acid were charged to the mixture, the oleic acid being a wetting agent for the filler and agitation was carried out under high shear. The temperature of the mixture was raised to 150° C. for 1 hour. The compound was then passed through a Manton-Gaulin homogenizer equipped with a conical valve and valve seat and operating at 8000 psi to reduce particle size and aid dispersion of the filler in the fluid. The compound was then further agitated 150° C. for 3 hours. It was then cooled to room temperature under agitation and used as is. The above procedures were given to be exemplary of the manner in which the compounds and fluids could be prepared whose anti-foam values are given in Table I and II below. Such procedures were actually utilized in the instant case to prepare the anti-foam compound with or without a silicone resin and with the incorporation of a filler in the composition. Results of the testing of the foregoing compounds and fluids is set forth in Table I and II below utilizing the procedures defined above. In Table I below there is given both the viscosity of the final anti-foam composition as well as the anti-foam value of the composition. The main difference is in the test between Table I and Table II below is that precipitated silica was utilized in the test in Table II while fumed silica was utilized in the tests of Table I. The results are set forth as follows:

TABLE I

| | | | Anti-Foam Compounds | | |
|---|---|---|---|---|---|
| Compound | Fluid | Silicone Resin | Fumed Silica Filler Level | (cps.) Viscosity | Anti-foam Value mg/ml |
| I | A | No | 5 | 320 | .60 |
| II | A | No | 7.5 | 400 | .70 |
| III | A | No | 10.0 | 520 | .70 |
| IV | K | Yes | 7.5 | 776 | .72 |
| V | K | Yes | 10.0 | 988 | .39 |
| VI | B | No | 7.5 | 1070 | .89 |
| VII | B | Yes | 7.5 | 1480 | .41 |
| VIII | E | Yes | 7.5 | 1710 | .31 |
| IX | F | Yes | 7.5 | 1340 | .65 |
| X | G | Yes | 7.5 | 1466 | .50 |
| XI | C | No | 7.5 | 3950 | .70 |
| XII | C | No | 10.0 | 6700 | .62 |
| XIII | H | Yes | 7.5 | 16,700 | .35 |
| XIV | H | Yes | 10.0 | 13,900 | .42 |

TABLE II

| | | | Anti-Foam Compounds | | |
|---|---|---|---|---|---|
| Compound | Fluid | Silicone Resin | Precipitated Silica Filler | (cps.) Viscosity | Anti-foam Value mg/ml |
| XV | B | No | 7.5 | 760 | .39 |
| XVI | B | No | 10.0 | 1070 | .34 |
| XVII | J | Yes | 7.5 | 1400 | .27 |

TABLE II-continued

| Compound | Fluid | Silicone Resin | Precipitated Silica Filler | (cps.) Viscosity | Anti-foam Value mg/ml |
|---|---|---|---|---|---|
| XVIII | J | Yes | 10.0 | 1700 | .32 |

The above results show the incorporation of a silicone resin in accordance with foregoing disclosure in combination with a high filler loading produces an anti-foam composition with excellent anti-foam values.

EXAMPLE III

The compounds and fluids of Example I above were then formed into emulsions and tested again for the emulsion stability as explained previously as well as for the anti-foam values in accordance with the procedures previously described. The exemplary procedure that was utilized to prepare the emulsions in the instant experiments is as follows:

To a steel beaker 82.4 parts of sorbitan monostearate to 57 parts of polyoxyethylene stearate and 180 parts of Part I water were charged and heated to 65° C. under high shear agitation. To this mixture there was added 315 parts of the anti-foam compound that was prepared as set forth in Example I, which compound was slowly added to the beaker while maintaining the temperature at 65° C. during the addition. Mixing was then continued until premix was uniform. Then 362.5 parts of additional water which was heated to 65° C. was added to the premix under high shear agitation. Mixing was continued while cooling to 57° C. The anti-foam emulsion was then milled on a two inch Manton-Gaulin Colloid Mill at a setting of 4 mils. The resultant emulsion was then cooled to room temperature under agitation. To this mixture and during the cooling period there was added 2 grams sorbic acid as a bactericide. The emulsion was tested as is. As has been stated previously, the above procedure was an exemplary procedure that was utilized in actual practice to prepare the anti-foam emulsions from the silicone compounds and fluids that were prepared as explained above in Example I. The actual weights that were utilized as can be appreciated will vary depending on the Ingredients present as set forth in Tables III and IV below where the anti-foam values are given. Thus, Tables III and IV below set forth the anti-foam values and the stability of the emulsions which were tested in accordance with the procedures described previously. Again, the main difference between the results in Table III and Table IV is that the filler that was utilized in the compounds of Table III was fumed silica while the filler utilized in the compounds and emulsions of Table IV was precipitated silica. With respect to the centrifuge stability column given below, the "T" indicates the value in milliliters of oil appearing at the top of the sample that was tested while the "B" value indicates the milliliters of sediment located at the bottom of the test vial after the foam stability test. "T" in the results column indicates trace amounts.

TABLE III

Anti-foam Emulsions

| Emulsion | Compound | Silicone Resin | Fumed Silica Filler | Centrifuge Stability T | Centrifuge Stability B | Anti-foam Value mg/ml |
|---|---|---|---|---|---|---|
| 20 | I | No | 5 | 2 | 1 | .54 |
| 21 | II | No | 7.5 | 2 | T | .72 |
| 22 | III | No | 10.0 | T | T | .65 |
| 23 | IV | Yes | 7.5 | T | T | .49 |
| 24 | V | Yes | 10.0 | T | T | .61 |

TABLE III-continued

Anti-foam Emulsions

| Emulsion | Compound | Silicone Resin | Fumed Silica Filler | Centrifuge Stability T | Centrifuge Stability B | Anti-foam Value mg/ml |
|---|---|---|---|---|---|---|
| 25 | VI | No | 7.5 | 5 | T | .64 |
| 26 | VII | Yes | 7.5 | 5 | .5 | .48 |
| 27 | VIII | Yes | 7.5 | 5 | .5 | .34 |
| 28 | XI | No | 7.5 | 10 | T | .53 |
| 29 | XII | No | 10.0 | T | 2 | .40 |
| 30 | XIII | Yes | 7.5 | T | T | .44 |
| 31 | XIV | Yes | 10.0 | T | 4 | .30 |

TABLE IV

Anti-foam Emulsions

| Emulsion | Compound | Silicone Resin | Precip. Silica Filler | Centrifuge Stability T | Centrifuge Stability B | Anti-foam Value mg/ml |
|---|---|---|---|---|---|---|
| 32 | XV | No | 7.5 | 6 | 10 | .24 |
| 33 | XVI | No | 10.0 | 2 | T | .21 |
| 34 | XVII | Yes | 7.5 | T | 10 | .17 |
| 35 | XVIII | Yes | 10.0 | T | 18 | .62 |

The results set forth in Tables III and IV above indicate the stable emulsions can be formed utilizing the silicone resins of the instant case. Accordingly, as the results indicate silicone resins composed of monofunctional and tetrafunctional siloxy units can be utilized with advantage in anti-foam compounds and anti-foam emulsions to produce anti-foam compounds and emulsions of improved anti-foaming properties.

We claim:

1. An anti-foam silicone emulsion composition consisting essentially of a diorganopolysiloxane polymer having a viscosity varying from 100 to 100,000 centipoise at 25° C. where the organo groups are selected from the class consisting of monovalent hydrocarbon radicals and halogenated hydrocarbon radicals and from 1 to 15% by weight of said diorganopolysiloxane of a condensed silicone resin composed of $R_3SiO_{0.5}$ units and $SiO_2$ units having a silanol content below 0.5% by weight where the ratio of the monofunctional units to the tetrafunctional units varies from 0.25 to 0.75 where R is selected from monovalent hydrocarbon radicals and halogenated monovalent hydrocarbon radicals and which emulsion contains from 10 to 40% by weight of the diorganopolysiloxane of emulsifying agents and water.

2. The anti-foam composition of claim 1 wherein the diorganopolysiloxane has up to 10% by weight of trifunctional siloxy units.

3. The anti-foam composition of claim 1 wherein the diorganopolysiloxane has the formula, $R_a' SiO_{4-a/2}$ where R' is selected from the class consisting of monovalent hydrocarbon radicals and halogenated monovalent hydrocarbon radicals and a varies from 1.9 to 2.1.

4. The anti-foam composition of claim 3 wherein R and R' are selected from the class consisting of lower alkyl radicals of 1 to 8 carbon atoms, phenyl and vinyl.

5. The anti-foam composition of claim 1 wherein there is further present from 0.5 to 15% by weight of the diorganopolysiloxane of a filler selected from the class consisting of fumed silica and precipitated silica.

6. The anti-foam composition of claim 5 wherein the filler is treated with silicone filler treating compounds selected from the class consisting of silazanes, cyclic polysiloxanes and low molecular weight linear polysiloxanes.

7. The anti-foam compositions of claim 5 wherein the filler is precipitated silica treated with silazanes.

8. The anti-foam compositions of claim 5 wherein said filler contains from 1 to 15% by weight of hydroxyl groups.

9. The anti-foam composition of claim 1 wherein the emulsifying agents are selected from the class consisting of sorbitan monostearate, polyoxyethylene sorbitan monostearate and polyoxyethylene stearate.

10. A process for forming an anti-foam emulsion composition consisting essentially of mixing a diorganopolysiloxane polymer having a viscosity varying from 100 to 100,000 centipoise at 25° C. where the organo groups are selected from the class consisting of monovalent hydrocarbon radicals and halogenated monovalent hydrocarbon radicals and from 1 to 15% by weight of said diorganopolysiloxane of a condensed silicone resin composed of $R_3SiO_{0.5}$ units and $SiO_2$ units having a silanol content below 0.5 weight percent where the ratio of the monofunctional units to the tetrafunctional units varies from 0.25 to 0.75 where R is selected from monovalent hydrocarbon radicals and halogenated monovalent hydrocarbon radicals to form a mixture and adding said mixture to from 10 to 40% by weight of the diorganopolysiloxane of emulsifying agents and water to form a second mixture and emulsifying the resulting second mixture.

11. The process of claim 10 wherein the diorganopolysiloxane has up to 10% of trifunctional siloxy units.

12. The process of claim 10 wherein the diorganopolysiloxane has the formula, $R'_a SiO_{4-a/2}$ where R' is selected from the class consisting of monovalent hydrocarbon radicals and halogenated monovalent hydrocarbon radicals and a varies from 1.9 to 2.1.

13. The process of claim 12 wherein R and R' are selected from the class consisting of lower alkyl radicals of 1 to 8 carbon atoms, phenyl and vinyl.

14. The process claim 10 further comprising mixing into the composition from 0.5 to 15% by weight of a filler selected from the class consisting of fumed silica and precipitated silica at a temperature in the range of 100° to 200° C. with constant agitation.

15. The process of claim 14 wherein the filler is treated with a filler treating silicone compound selected from the class consisting of silazanes, cyclic polysiloxanes and low molecular weight linear polysiloxanes.

16. The process of claim 14 wherein the filler is precipitated silica treated with silazanes.

17. The process of claim 14 wherein said filler contains from 0.1 to 15% by weight of hydroxyl groups.

18. The process of claim 14 comprising forming an emulsion of said anti-foam compound by adding at temperatures of 40°–100° C. emulsifying agents to water under high shear agitation; mixing into the above mixture the product of claim 14 with constant agitation at temperatures 60°–100° C. then adding to the mixture additional water under constant agitation and milling the emulsion in a colloidal mill at temperatures of 60°–100° C.

19. The process of claim 18 wherein said emulsifying agents are selected from the class consisting of sorbitan monostearate, polyoxyethylene sorbitan monostearate and polyoxyethylene stearate and are present at a concentration of 10 to 40% by weight of said diorganopolysiloxane.

20. A process defoaming a foamed composition consisting essentially of adding to said foamed composition an effective amount of silicone emulsion composition composed of a diorganopolysiloxane polymer having a viscosity varying from 100 to 100,000 centipoise at 25° C. where the organo groups are selected from the class consisting of monovalent hydrocarbon radicals and halogenated monovalent hydrocarbon radicals and from 1 to 15% by weight of said diorganopolysiloxane of a condensed silicone resin composed of $R_3SiO_{0.5}$ units and $SiO_2$ units having a silanol content below 0.5 weight percent where the ratio of monofunctional units to tetrafunctional units varies from 0.25 to 0.75 where R is selected from monovalent hydrocarbon radicals and halogenated monovalent hydrocarbon radicals and which emulsion contains from 10 to 40% by weight of the diorganopolysiloxane of emulsifying agents and water.

* * * * *